Jan. 18, 1966  F. S. SADLER  3,230,107
THERMALLY STABILIZED CELLULOSE MATERIALS
Filed March 27, 1963
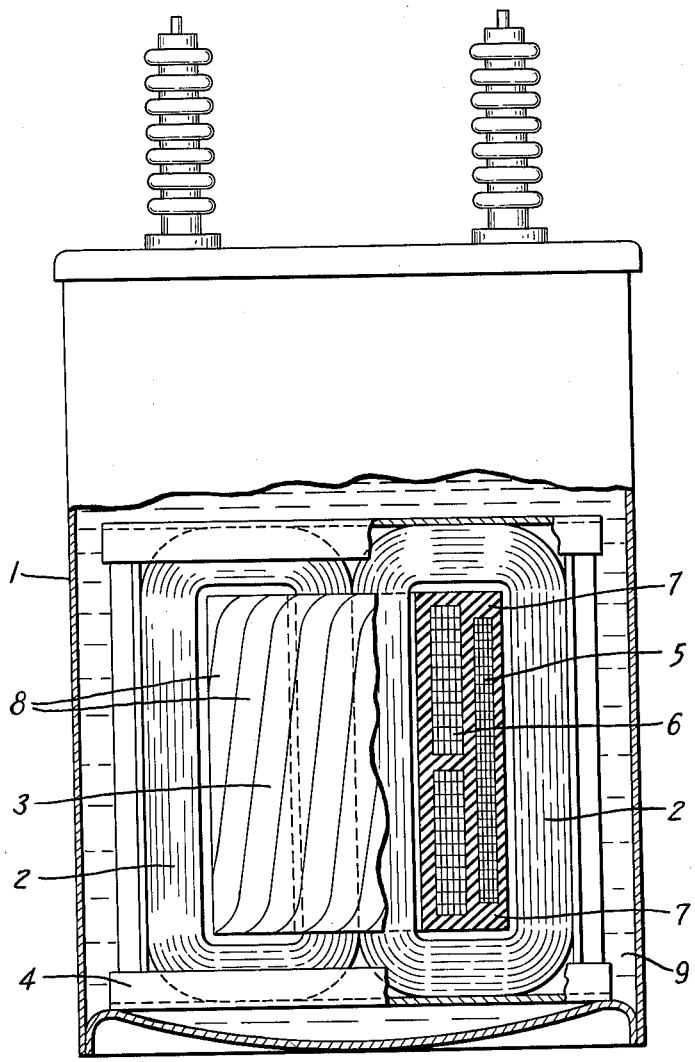
INVENTOR.
FRED S. SADLER
BY
Andrus & Starke
ATTORNEYS United States Patent Office 3,230,107
Patented Jan. 18, 1966

1

3,230,107
THERMALLY STABILIZED CELLULOSE
MATERIALS
Fred S. Sadler, Orange, N.J., assignor to McGraw-Edison
Company, Milwaukee, Wis., a corporation of Delaware
Filed Mar. 27, 1963, Ser. No. 268,401
4 Claims. (Cl. 117—143)

This invention relates to cellulosic materials having improved thermal stability and more particularly to cellulosic materials to be used as insulation in electrical apparatus.

Cellulose fibers tend to deteriorate when subjected to elevated temperatures for extended periods of time. This presents a very serious problem with respect to many applications of cellulosic materials. For example, the problem is encountered in using cellulose fiber cord type reinforcing in rubber articles, such as pneumatic tires, steam hoses, conveyor belts and the like. It is also encountered in electrical apparatus employing cellulose insulation materials.

Cellulose fiber reinforced rubber articles are subjected to elevated temperatures in normal use, either from external heat, or from heat which is generated internally by reason of repeated rapid flexing, as in the case of pneumatic tires. The resultant deterioration of the reinforcing fibers is evidenced by a progressive reduction in their strength until eventually they fracture. This constitutes a principal cause of failure of such articles as pneumatic tires and steam hose.

Cellulose insulation materials which are used extensively in electrical apparatus are also subjected to elevated temperatures in use. Here, however, the deterioration problem is increased by other factors, particularly where the insulation materials are in contact with, or immersed in, liquid dielectrics such as transformer oils. The elevated temperatures may cause the liquid dielectrics to break down into their chemical constituents, and the resultant deterioration products may in turn attack the cellulose insulation materials.

The present invention is directed to cellulose fibers to be used as internal reinforcement or insulation having improved thermal stability and which will resist deterioration or decomposition at elevated temperatures.

According to the invention, the cellulose fibers are impregnated with phenylene diamine which increases the ability of the cellulose fibers to withstand deterioration by the action of heat over extended periods of time. Even greater improved thermal stability can be obtained if the phenylene diamine is used in combination with a cyclic diamine, such as piperazine, or in combination with pentaerythritol.

It has been found that by this method of treating the cellulose fibers, the fibers are not only protected against thermal deterioration, but are also stabilized against attack from decomposition products of the transformer oil or other liquid dielectrics. For this reason, cellulose insulation materials treated in accordance with the invention are particularly adapted for use in oil filled transformers or other similar electrical apparatus.

Other objects and advantages will appear in the course of the following description.

The drawing is a sectional view of a transformer embodying cellulose insulation which has been treated in accordance with the invention.

The transformer, as shown in the drawing, is encased within a tank 1 and consists of a magnetic core 2 and a coil 3, both of which are supported in spaced relation from the bottom of the tank 1 by channel support members 4 or the like. The coil 3 comprises a high voltage winding 5 and a low voltage winding 6 which are

2 insulated from one another by the treated cellulose insulation 7. A treated cellulose wrapping 8 may also be applied to the exterior of the coil 3. A dielectric liquid 9 comprising oil, chlorinated diphenyl, or the like is disposed within the tank 1 to cover the core 2 and the coil 3 in order to insulate them and to dissipate the heat generated during operation.

The cellulose insulating materials 7 and 8 may be composed of rag, kraft or manilla paper or other cellulosic material, such as rayon or the like, and are either impregnated with phenylene diamine alone, or with phenylene diamine and a cyclic diamine, or with phenylene diamine and pentaerythritol.

It is preferred to impregnate the cellulose fiber material with ortho-phenylene diamine. While para and meta phenylene diamine show some significant advantage in increasing the thermal stability of the cellulosic materials, the advantage achieved by the para and meta forms is not as great as that achieved by ortho phenylene diamine.

The cyclic diamine which can be combined with the phenylene diamine has the following formula:

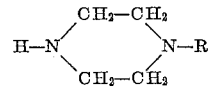

where R is either a hydrogen atom or an alkyl amino group containing from 1 to 6 carbon atoms. Specific examples of the cyclic diamine which can be employed are piperazine, amino ethyl piperazine, and the like.

It has also been found that the combination of phenylene diamine and pentaerythritol also provides improved thermal stability of the cellulose fiber material.

The active ingredients, either phenylene diamine alone, or phenylene diamine with piperazine, or phenylene diamine with pentaerythritol, are preferably applied to the cellulose fibers in the form of an aqueous solution. The fibers can be impregnated in any suitable manner, such as by immersing the fibers in the treating solution for a time sufficient to fully impregnate the fibers. The fibers can also be impregnated by spraying, brushing, dipping, size press addition, or the like.

It is important that the fibers are fully impregnated with the treating solution so that each individual fiber is reacted with the active ingredient. The impregnation differs from surface coating processes in which only the outer surface of the material is coated with the active ingredient.

The impregnation of the cellulose fibers can be carried out at room temperature, or at elevated temperatures up to the boiling point of the solutions employed. The time of contact between the cellulose fibers and the solution should be sufficient to permit substantial penetration or impregnation of the fibers. Generally, a contact time of 15 seconds to 10 minutes is adequate for impregnation, although longer treatment periods can be employed without adversely affecting the composition.

While an aqueous treating solution is the most practical, other types of evaporable solvents can be substituted for water.

It has been found that the concentration of the active ingredients used in the treating solution may vary considerably depending on the active ingredients used and the method of application. Although it is somewhat more difficult to achieve the desired impregnation from very dilute solutions as compared to more concentrated solutions, solutions containing as little as 0.5% active ingredients have been used. Generally, solutions containing from 2 to 5% active ingredients are preferred.

In the case of phenylene diamine alone, the minimum concentration of the aqueous treating solution is about 0.5% by weight of phenylene diamine and the maximum concentration is that of saturation. Normally, when using phenylene diamine alone, the solution will contain approximately 5% solids and the cellulose material is treated with the solution at approximately 140° F.

In the case of phenylene diamine and the cyclic diamine, such as piperazine, the minimum concentration of total active ingredients is approximately 0.5% by weight for each compound and the maximum concentration is again saturation for each of the individual compounds.

When using phenylene diamine and pentaerythritol, the minimum concentration of each active ingredient is about 0.5% by weight, and the maximum concentration of pentaerythritol is 5%, while the maximum concentration of phenylene diamine is saturation.

The weight relationship between the phenylene diamine and the cyclic diamine, or between the phenylene diamine and pentaerythritol, is not particularly critical. It has been found that phenylene diamine can be used in the weight ratio of 1:5 to 5:1 with respect to either the cyclic diamine, such as piperazine, or the pentaerythritol.

After treating solution has been applied to the cellulose material for the desired period of time to provide adequate impregnation, the excess solution is removed or drained from the cellulose and the cellulose is dried, either at room temperature, or at a suitable elevated temperature to evaporate the solvent or carrier.

Generally, the greater amount of active ingredients present, the more the cellulose fibers are stabilized. However, because several different active ingredients may be used in varying proportions in the treating solution, it is difficult to provide a meaningful quantitive indication of the degree of stabilization obtained. It has been found, however, that when the active ingredients are present in the amount of 0.7% to 100% by weight of the fiber, substantial improvement in the thermal stability of the fibers is obtained. This concentration of active ingredients in the dried product corresponds generally to 0.1% to 3.0% by weight of nitrogen.

The cellulose fibers treated in accordance with the invention have greatly improved thermal stability enabling the cellulose fibers to withstand the deteriorating action of heat over extended periods of time. Moreover, the cellulose fiber material has increased resistance to cracking or rupturing along folds in the material. This is particularly important when the cellulose fiber is used as an insulating material in an electrical apparatus and may be subjected to severe strains or shock caused by lightning or the like. The severe strain may cause fractures of the cellulose paper, and fractures generally occur along the folds. The material treated in accordance with the invention has greatly improved resistance to cracking along lines of fold.

The following example illustrates the process of the invention:

Sheets of kraft paper 8″ x 8″ and 5 mils thick were immersed in aqueous solutions containing the active ingredients set forth in the table below. The sheets of paper were immersed in each treating solution until the paper was thoroughly soaked or impregnated and then allowed to air dry at room temperature. The impregnated sheets were then placed in glass tubes containing insulated copper wire 21″ (16 gauge Formvar coated) and copper foil (14″ x 1″ x 2 mils). This paper copper system was placed in an oven at 135° C. for 16 hours. During this time a pressure of 0.1 mm. was maintained within the tube. At the end of this drying period the evacuated tubes containing the impregnated papers were filled under vacuum with an inhibited transformer oil, leaving an air space in each tube of approximately 15% of the total volume. The air space in each tube was then filled to one atmosphere pressure with dry air. The tubes were then sealed off with an oxygen gas torch.

The sealed glass tubes were then placed in an oven at 170° C. for five days. The physical properties of the heat aged paper, along with a control sample, were tested and are shown in the following table:

*Table I*

| Sample | Wt. percent of additives in aqueous solution | Hours aged at 170° C. | Tensile strength, p.s.i. | Tear strength, p.s.i. | Burst strength, p.s.i. | Number of folds after aging before breaking | Percent of original tensile strength retained | Percent of original tear strength retained | Percent of original burst strength retained |
|---|---|---|---|---|---|---|---|---|---|
| 1 | 0 | 0 | 40.1 | 63 | 76 | 70 | 100 | 100 | 100 |
| 2 | 0 (control) | 120 | 18.6 | 9 | 9 | 0 | 24 | 14 | 12 |
| 3 | 2% o-phenylene diamine | 120 | 33.6 | 69 | 63 | 15 | 86 | 109 | 87 |
| 4 | 3% o-phenylene diamine | 120 | 34.0 | 57 | 68 | 16 | 87 | 91 | 93 |
| 5 | 4% o-phenylene diamine | 120 | 29.9 | 63 | 72 | 35 | 76 | 103 | 95 |
| 6 | 1% o-phenylene diamine and 1% piperazine | 120 | 31.0 | 40 | 53 | 21 | 90 | 95 | 93 |
| 7 | 1% o-phenylene diamine and 3% piperazine | 120 | 25.9 | 22 | 41 | 5 | 86 | 82 | 95 |
| 8 | 2% o-phenylene diamine and 1% piperazine | 120 | 33.6 | 44 | 64 | 19 | 86 | 70 | 84 |
| 9 | 2% o-phenylene diamine and 3% piperazine | 120 | 29.6 | 61 | 58 | 6 | 75 | 97 | 76 |
| 10 | 1% o-phenylene diamine and 1% pentaerythritol | 120 | 30.0 | 56 | 55 | 9 | 76 | 89 | 72 |
| 11 | 1% o-phenylene diamine and 2% pentaerythritol | 120 | 32.9 | 58 | 68 | 15 | 84 | 92 | 90 |
| 12 | 1% o-phenylene diamine and 4% pentaerythritol | 120 | 30.9 | 55 | 69 | 53 | 79 | 84 | 91 |

From the above table, it can be seen that the control sample 2, which was treated only with water without additives and aged at 170° C., retained only 24% of its original tensile strength, 14% of its original tear strength and 12% of its original burst strength after aging. In contrast to this, the samples 3–12 which were treated with o-phenylene diamine alone, or o-phenylene diamine and piperazine, or o-phenylene diamine and pentaerythritol retained a substantially greater percent of their original tensile, tear and burst strength than the control sample 2, thereby indicating the definite improvement in the thermal stability of the cellulose material.

In addition, the phenylene diamine, either alone or in combination with other ingredients, substantially improves the flexibility of the kraft paper, as shown by the number of folds before breaking. The control sample 2 fractured after 0 fold, and with the use of the present invention, the number of folds was increased to as high as 53 before breaking. This flexibility is particularly important when the treated cellulose material is used in an electrical apparatus, because electrical failures are primarily due to an initial mechanical breakdown of the insulating material. The increased flexibility of the insulating material provided by the invention greatly decreases the possibility of a mechanical breakdown in the cellulose insulated material and thereby reduces the possibilities of an electrical failure.

Various modes of carrying out the invention are contemplated as being within the scope of the following claims particularly pointing out and distinctly claiming the subject matter which is regarded as the invention.

I claim:

1. A cellulose material having improved thermal stability for use at elevated temperatures, comprising a cellulose fiber base impregnated with a mixture consisting essentially of phenylene diamine and pentaerythritol, said mixture being present in the amount of 0.7 to 100% by weight of the base and the weight ratio of phenylene diamine to pentaerythritol being 1:5 to 5:1.

2. The cellulose material of claim 1 in which the phenylene diamine is ortho-phenylene diamine.

3. A cellulose material having improved thermal stability for use at elevated temperatures, comprising a cellulose fiber base impregnated with a mixture consisting essentially of phenylene diamine and a cyclic diamine having the following formula:

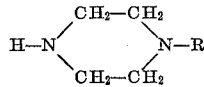

where R is selected from the group consisting of hydrogen and an alkyl amino group having from 1 to 6 carbon atoms, said mixture being present in the amount of 0.7 to 100% by weight of the base and the weight ratio of phenylene diamine to the cyclic diamine being 1:5 to 5:1.

4. The cellulose material of claim 3 in which the phenylene diamine is ortho-phenylene diamine and the cyclic diamine is piperazine.

References Cited by the Examiner

UNITED STATES PATENTS

| | | | |
|---|---|---|---|
| 2,050,196 | 8/1936 | Sebrell | 117—136 |
| 2,665,230 | 1/1954 | Buckwalter | 117—144 |
| 2,782,134 | 2/1957 | Musgrave | 117—154 |

OTHER REFERENCES

Evelyn Berlow et al., The Pentaerythritols, American Chemical Society, Monograph Series No. 136, 1958, pp. 279 to 280 pertinent, QD341.A4B56.

WILLIAM D. MARTIN, *Primary Examiner.*

RICHARD D. NEVIUS, *Examiner.*